May 19, 1970
P. N. ARMSTRONG
3,513,448
BUFFER SYSTEM
Filed June 11, 1969
9 Sheets-Sheet 3
Fig. 4 (Circuit $S_i$)
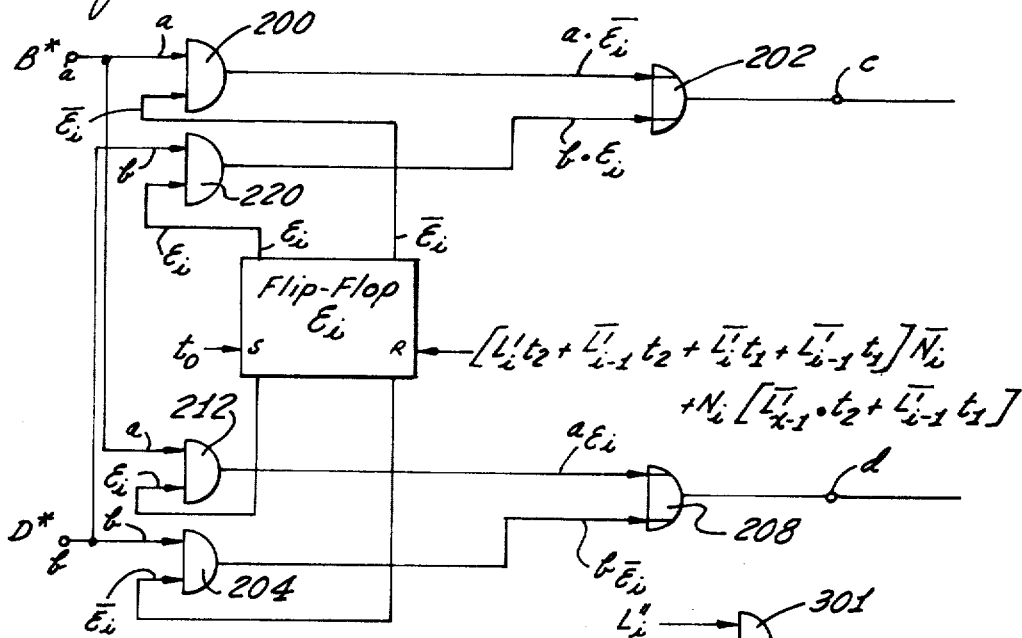
Fig. 5 (Circuit $B_i$)
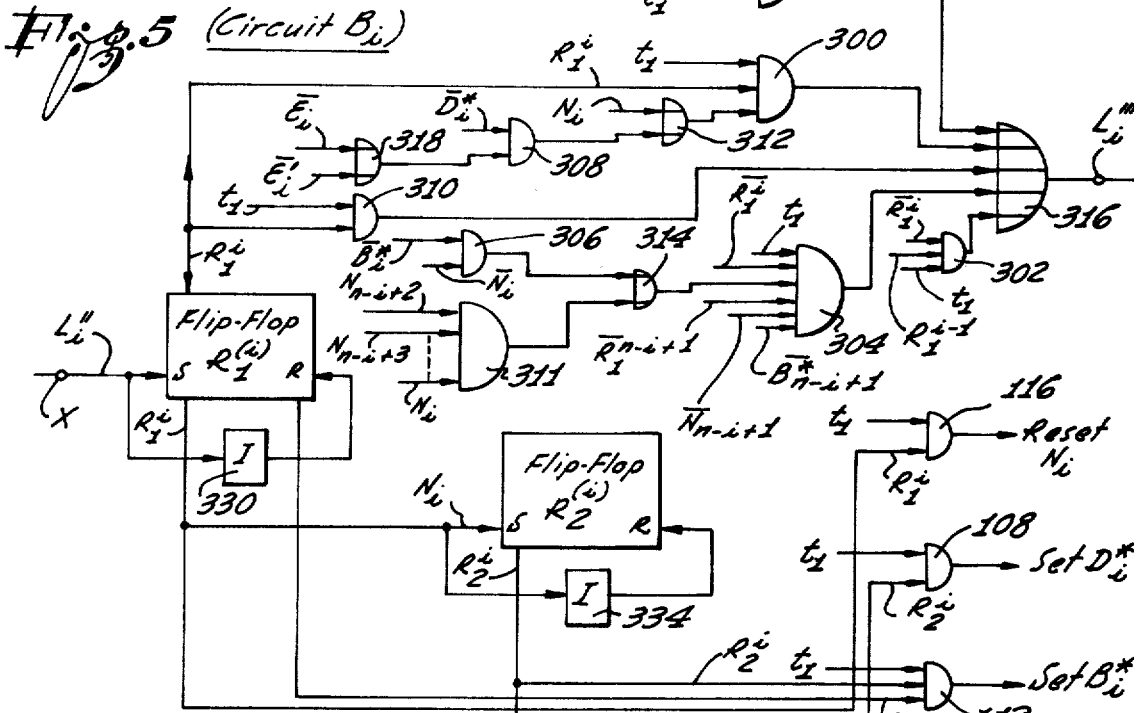
INVENTOR
Philip N. Armstrong
ATTORNEYS

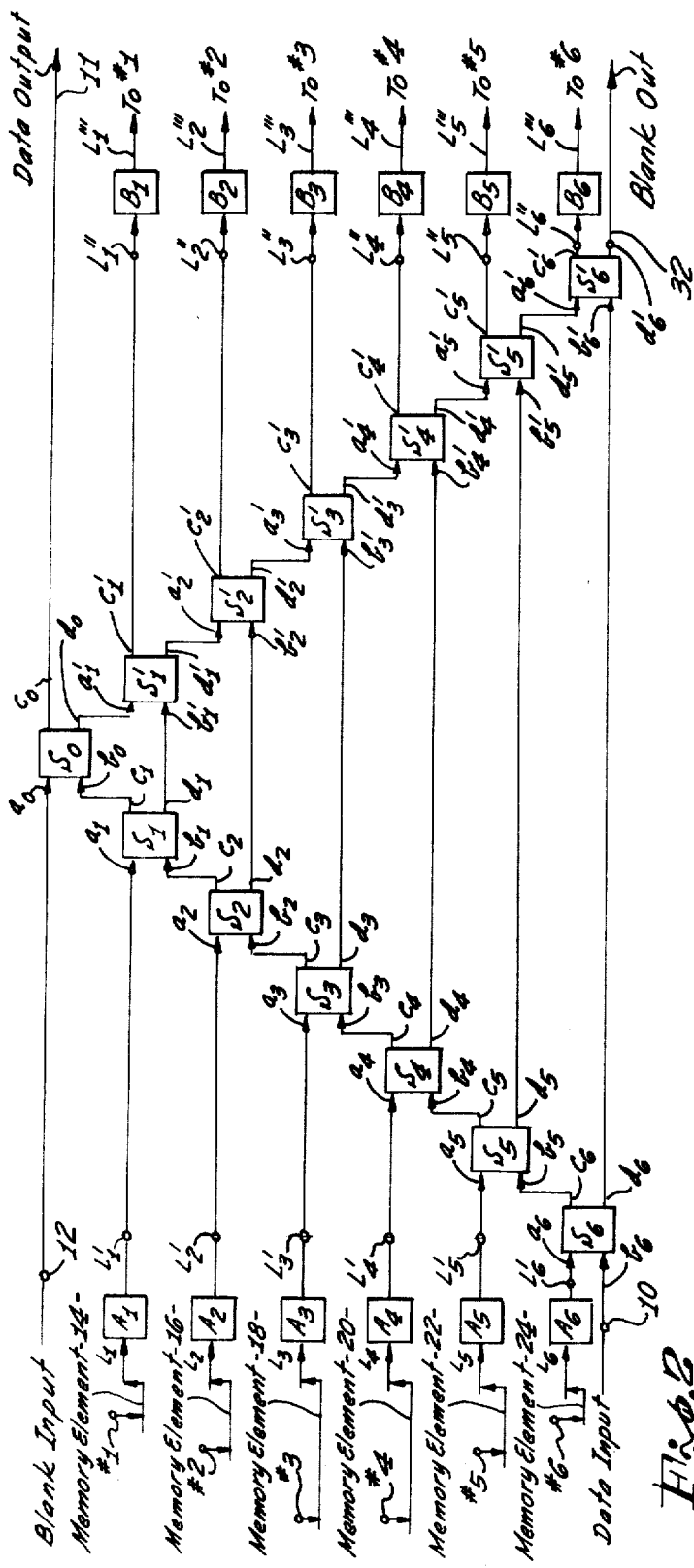
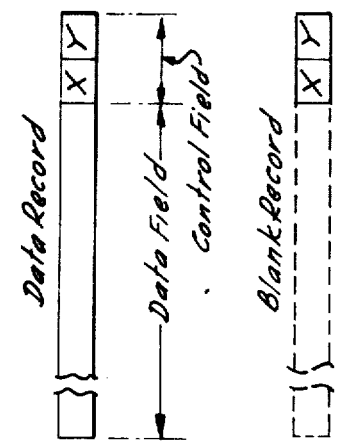
Fig. 1
Fig. 2

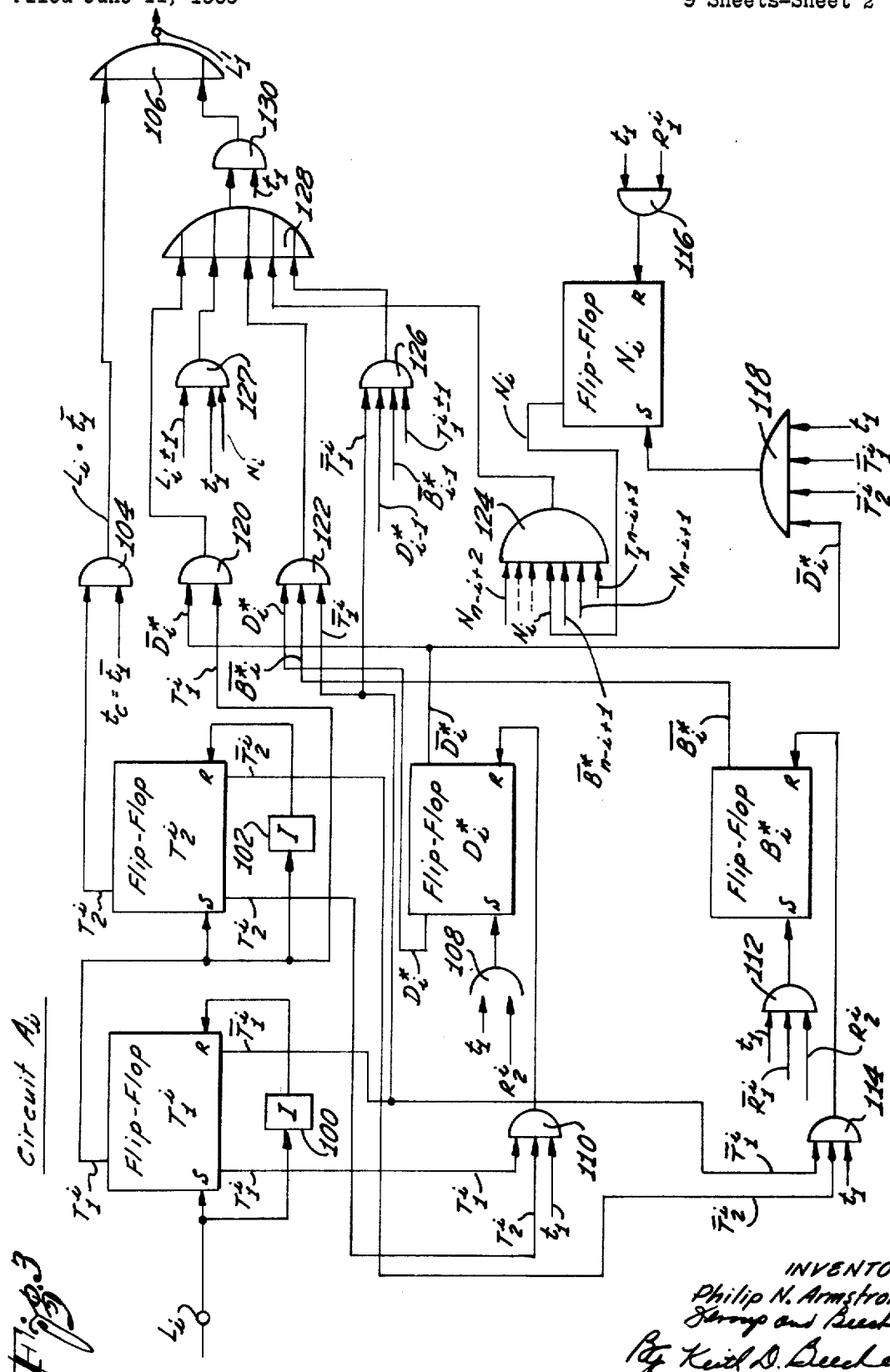

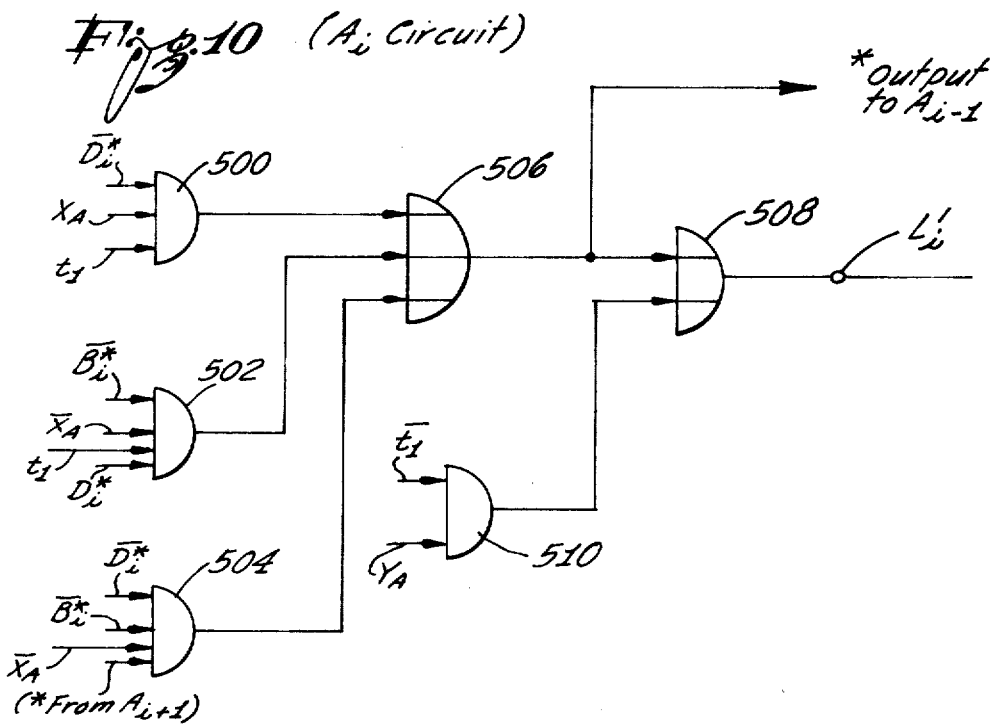
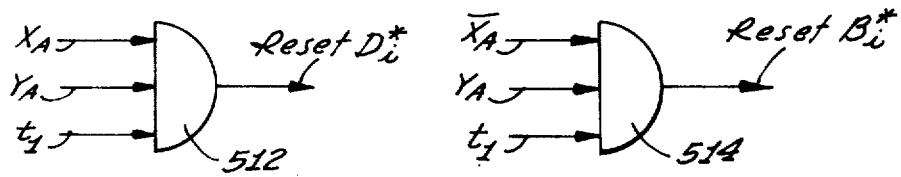

May 19, 1970 P. N. ARMSTRONG 3,513,448
BUFFER SYSTEM
Filed June 11, 1969 9 Sheets-Sheet 9
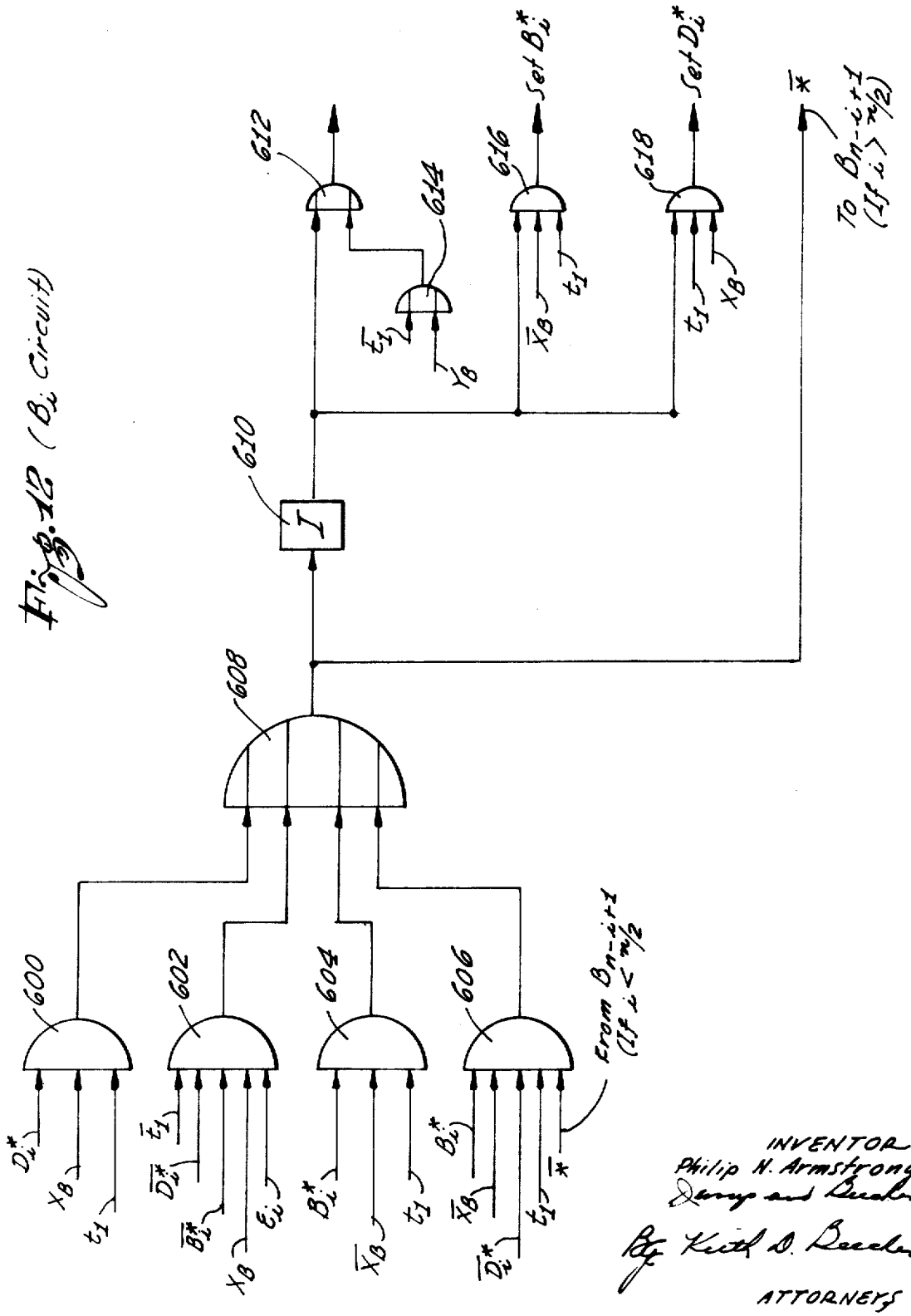

United States Patent Office 3,513,448
Patented May 19, 1970

3,513,448
BUFFER SYSTEM
Philip N. Armstrong, 1733 Keegan Way,
Santa Ana, Calif. 92705
Continuation-in-part of application Ser. No. 610,666,
Jan. 20, 1967. This application June 11, 1969, Ser.
No. 832,333
Int. Cl. G06k 17/00
U.S. Cl. 340—172.5
11 Claims

ABSTRACT OF THE DISCLOSURE

The invention relates to a buffer data storage system of the dynamic circulating type for binary data in a processing system. Data is introduced serially to the input and may be derived serially from the output at any time on a first-in, first-out basis.

---

This application is a continuation-in-part of copending application Ser. No. 610,666, filed Jan. 20, 1967 which has now been abandoned.

BACKGROUND OF THE INVENTION

The present invention relates generally to electronic binary data handling equipment and systems, and it is more particularly concerned with an improved buffer storage apparatus for use in data processing systems. The buffer system of the invention includes components similar to those described in U.S. Pats. 3,329,939; 3,336,580; and 3,399,383.

SUMMARY OF THE INVENTION

The improved buffer data storage apparatus of the invention is of the dynamic circulating type, in which data is introduced at the input thereof as a serial stream of binary multi-bit records; and from which the data may be derived at the output thereof, when required, and in exactly the same record order in which it was introduced.

A feature of the system is that it exhibits overall variable delay line characteristics, in that the first record of any number of records serially introduced into the buffer can be recovered within one record time after it has been entered. This means that the buffer storage apparatus of the invention has a tremendous flexibility, in that it can be used to store several or a vast multiplicity of records, without sacrifice in recovery time, regardless of how few records may be introduced into the buffer for any particular operation.

The improved buffer to be described has the capabilities of magnetic tape data correlating apparatus in which the tape is stored between a write and a read station; the amount of stored tape depending upon the number of record times desired between writing and reading. The buffer of the invention is for use generally in the autocorrelation of data.

As an additional feature, records may be recovered serially from the output of the buffer store apparatus of the invention concurrently with the serial introduction of other records into the buffer.

A primary object of the invention is to provide an improved, simple and relatively inexpensive buffer storage apparatus having the features referred to above.

Another object of the invention is to provide such an improved buffer storage apparatus of which a particular constructed embodiment is capable of storing with a minimum of access time, any number of records up to a predetermined maximum; and which is conceived so that its embodiments may be constructed to handle any desired maximum number of records, as required by any particular installation.

As will become evident as the description proceeds, the improved buffer storage apparatus and system of the invention is capable of receiving and storing data so long as it is not full. Any data record may be introduced into the buffer system in a maximum of two record times. That is, $n$ records can be serially introduced into the buffer of the invention in not more than $n+1$ record times. Also, the introduction of data records into the buffer can be interrupted and recommenced at any record time, and each such interruption may continue for any desired number of record times.

Moreover, and as mentioned above, a serial stream of records may be derived from the output of the buffer at any record time, in excess of one, after a first record has been fed into the system. Not more than "$m+1$" record times are required to recover $m$ records from the buffer, and this output operation can be commenced immediately after the first record is fed into the buffer. Moreover, the output operation can be commenced at any time, and can be interrupted after it has been commenced at any record time, and the interruption can continue for any desired number of record times.

The features of the invention which are believed to be new are set forth with particularity in the claims. The invention itself, however, together with further objects and advantages may best be understood by reference to the following specification, when taken in conjunction with the accompanying drawings, in which:

BRIEF DESCRIPTION OF THE DRAWINGS

FIG. 1 illustrates the binary bit composition of the various data and blank records utilized in the system of the invention;

FIG. 2 is a block diagram of a buffer storage apparatus constructed in accordance with one embodiment of the invention;

FIGS. 3–5 are logic circuit diagrams of the various components which go to make up the buffer storage apparatus of FIG. 2;

FIGS. 10–12 are logic diagrams of circuitry included in the embodiment of FIG. 9.

DETAILED DESCRIPTION OF THE ILLUSTRATED EMBODIMENTS

Figure 6:
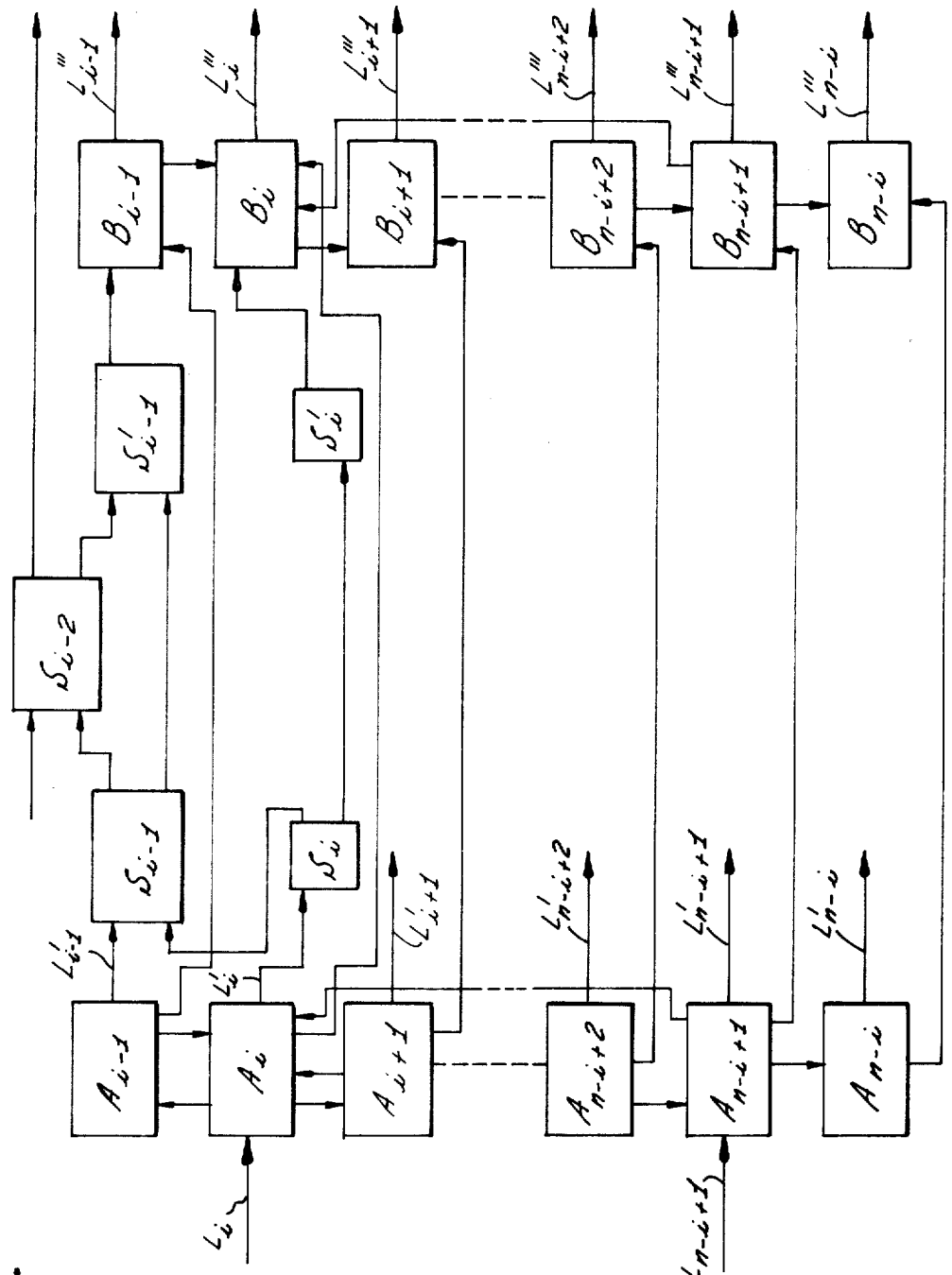
FIG. 6 is a block diagram showing the connections between the various logic circuits.

As mentioned above, the binary data which is fed into the buffer store apparatus and system of the invention for storage therein until needed is divided into a plurality of individual records, each record being composed of the same number of binary bits, and each including a two-bit control field. The data record, as shown in FIG. 1, includes a multi-bit data field, as well as a two-bit control field. The data field may be made up of any selected number of binary bits, for example, from one hundred (or less) to many thousand. When the indicated control bit $X=1$, the indication is that the record is actually a data record. Then, the control bit Y may be coded, as shown in FIG. 1, to designate an ordinary data record (D) ($Y=0$), or a distinguished data record (D*) ($Y=1$). The significance of these two types of data records will be described subsequently. Each record is fed into the system at successive bit times $t_1$, $t_2$, $t_3$. . . . The control bit Y occurs at $t_1$ bit time and the control bit X occurs at $t_2$ bit time.

Likewise, with respect to the blank record, the X-bit in the control field is made equal to zero. Then, the Y-bit may be coded, as shown, so that when $Y=0$, an ordinary blank record (B) is indicated; whereas, when $Y=1$ a distinguished blank record (B*) is indicated. These data and blank records are described in more detail in the aforesaid patents.

The construction of the buffer determines the size of the record which it can handle. However, the buffer construction can be tailored to handle records of any size up to, for example, several thousand bits. However, each record must include at least four bits, and it is contemplated that for most applications, records of 100 data bits or more would be accommodated. However, it will become evident that when the buffer of the invention is combined with a conventional buffer, the data blocks may indeed be three or four bits long.

As will be described in detail in conjunction with the block diagram of FIG. 2, the buffer storage apparatus of the invention includes a series of serial memory elements of various record lengths. These memory elements are in the form of delay lines, or their equivalent, such as described in the aforesaid patents. Data is introduced into one end of each such delay line memory element as a serial record stream, and it emerges from the other end at a later record time, as determined by the effective length of the particular delay line memory element.

It should be noted that the term "record time" as used herein denotes the time required to pass one record, of the type shown in FIG. 1, on a serial bit-by-bit basis into any one of the aforesaid delay line memory elements.

The number of serial delay line memory elements included in the apparatus is, for example, in the following progessions: 1, 2, 4 . . . $2^n$, $2^n$, $2^{n-1}$, $2^{n-2}$ . . . 1 (if $n$ is even); and 1, 2, 4 . . . $2^{n-1}$, $2^n$, $2^{n-1}$ . . . 1 (if $n$ is odd). In the above progressions, the numerals represent the lengths of the various memory elements in terms of records. However, if the data is to be taken out of the buffer in one long series of data words, with no hiatus, there is no need for the lines represented by the upper half of each progression. Likewise, if the data is to be fed into the buffer in one long series of words, with no interruptions, there is no need for the lines represented by the lower half of each progression.

A block representation of the buffer store, representing one embodiment of the invention, is shown in FIG. 2. The store includes a first group of circuits, represented by the blocks $S_0$–$S_6$, and a second group of circuits represented by the blocks $S'_1$–$S'_6$.

All the circuits mentioned in the preceding paragraph are the same, and each may be composed of the logic circuit details shown in FIG. 4 under the designation $S_i$, as will be described in detail subsequently herein. The circuit $S_i$ serves to exchange its two inputs, under certain conditions, as will be described.

The block representation of FIG. 2 also includes a plurality of circuits represented by the blocks $A_1$–$A_6$. All these circuits are essentially the same, except for certain differences to be described. The logic circuit details which make up the individual circuits are shown in FIG. 3 under the designation $A_i$, as will be described in detail subsequently in the present specification.

The circuit $A_1$ determines whether any particular record output of a corresponding memory element is a first or "distinguished" record (D* or B*) and is, therefore, eligible for exchange in the associated circuit $S_i$ with the output of another memory element.

The block representation of FIG. 2 also includes a plurality of circuits represented by the blocks $B_1$–$B_6$. All these latter circuits are the same, and the logic details of the individual circuits are shown in FIG. 5, under the designation $B_i$. This latter circuit, likewise, will be discussed in detail in the ensuing description.

The circuit $B_i$ serves to label the records passed through it to the corresponding one of the memory elements. For example, if a particular record is a first record, it must be "distinguished," so that a "1" is left inthe Y control bit position. If, on the other hand, a particular record passed through the circuit $B_i$ is not a first record, a "0" is placed in the Y control bit position.

It will be appreciated that data records of the type illustrated, for example, in FIG. 1A are fed into the system in a serial stream along a line 10, from any data source, or sources. These data records are such that their control fields designate distinguished data (D*) $(X \cdot Y)$. As pointed out previously, this stream may be interrupted after any number of records have been fed into the system, and can be subsequently recommenced after any number of record times have elapsed. The line 10 connects, as shown, with one of the input terminals $b_6$ of the circuit $S_6$.

As mentioned above, the system of the invention is capable of storing the stream of records introduced into it along the line 10, and of then producing the stream of records in the same order, whenever desired. Also, the system of the invention is capable of producing the first record of the input stream at its output in not more than one record time if so desired. The records are caused to appear at the output line 11 of the buffer system by the introduction of distinguished blank records (B*), of the type shown in FIG. 1B, along the line 12, which line connects with the input terminal $a_0$ of the circuit $S_0$. At all other times, blank records (B) $(\overline{X} \cdot \overline{Y})$ are introduced to the system along the line 12. The blank records appear on the output line 11 of the buffer and serve to hold the data records in the system until the output operation is commenced. The blank records B are also used for other purposes, as will become evident as the description proceeds. This action is similar to that described in the aforesaid patents.

The buffer system of FIG. 2 includes a series of delay line memory elements, these being designated in the illustrated embodiments as 14, 16, 18, 20, 22 and 24. The memory elements have record lengths selected in accordance with the formula previously set out herein. In the illustrated example, for example, the memory elements are 1, 2, 4, 4, 2, 1 record lengths respectively.

It will be appreciated that the memory elements 14, 16, 18, 20, 22 and 24 may be in the form of actual delay lines, of any particular known construction. Also, these memory elements may be constituted by writing the records on individual tracks of a memory disc, tape or drum, and of subsequently reading the records at the predetermined number of record times, so as to constitute the desired effective delay, or storage time, in the individual memory elements. Similarly, they may be composed of magnetic core memories of conventional construction with appropriate capacities, or suitably equipped magnetic tape equipment. Suitable memory elements for this purpose are shown and described, for example, in Armstrong Pats. 3,015,089 and 3,399,383.

As shown, the outputs #1–#6 of the respective circuits $B_1$–$B_6$ circulate back to the inputs of respective ones of the memory elements 14, 16, 18, 20, 22 and 24.

The outputs $L_1$–$L_6$ ($L_1$) of the respective memory elements are introduced to the respective circuits $A_1$–$A_6$ ($A_1$). The circuits $A_1$–$A_6$ are connected to the input terminals of the circuits $S_0$–$S_6$ ($S_1$), in the manner shown, and these latter circuits are interconnected with each other, and with the circuits $S'_1$–$S'_6$ ($S'_1$) in the illustrated chain relationship. The circuits $S'_1$–$S'_6$ are connected to respective ones of the circuits $B_1$–$B_6$. When distinguished blank records (B*) are introduced along the line 12 into the system, the data records are derived on the line 11 which is connected to the output terminal $c_0$ of the circuit $S_0$. At the same time, blank records appear on the line 32 which is connected to the output terminal $d'_6$ of the circuit $S'_6$.

As mentioned above, the logic details of the circuit $A_i$ are shown in FIG. 3. This circuit is used to cause an output record from the corresponding memory elements 14, 16, 18, 20, 22 or 24 (designated generally as $L_i$) to be distinguished (D* or B*) under the proper circumstances, so that it will be eligible for exchange with the output of another memory element. On the other hand, the circuit $A_i$ removes the * from the record (D* or B*) from its corresponding memory element if the proper circumstances are not fulfilled.

For example, a data record (D) coming out of the corresponding memory element ($L_i$) is caused to become D* by the $A_i$ circuit if there is no distinguished record (D*) in the memory element as designated by the logic term $(\overline{D}_i^*)$.

The circuit $A_i$ also serves to cause a blank record (B) received from the corresponding memory element ($L_i$) to be distinguished (B*) when there are no distinguished blank records (B*) in the memory element, and there is data in the corresponding memory element as designated by the logic term $(D^*_i \overline{B}^*_i)$.

In addition, if a particular circuit $A_i$ is in the upper half of the system $$\left(i < \frac{n}{2}\right)$$

and if all the memory elements between $i$ and $n-i+1$ are empty ($N_i$); then if a distinguished blank record (B*) is detected by a circuit $A_i$, then any blank record (B) detected by $A_{i-1}$ and $A_{n-i+1}$ is distinguished (B*). If $A_i$ is in the lower half of the system $$\left(i > \frac{n}{2}\right)$$

and a distinguished blank record (B*) is detected in $A_{n-i+1}$, a blank record (B) in $A_{n-i+2}$ is distinguished (B*) if $A_{n-i+2}$ has no B* ($\overline{B}_{n-i+2}$).

The circuit for accomplishing the above is shown as $A_i$ in FIG. 3. The circuit $A_i$ includes a pair of flip-flops $T^1_1$ and $T^1_2$. These are connected as a two-bit shift register. The input $L_i$, which is derived from the associated memory elements 14, 16, 18, 20, 22 or 24, is introduced to the set input terminal S of the flip-flop $T^1_1$, and through an inverter 100 to the reset input terminal R of that flip-flop. The $T^1_1$ output from the flip-flop $T^1_1$ is applied to the set input terminal of the flip-flop $T^1_2$, and through an inverter 102 to the reset input terminal.

It will be appreciated that as the input $L_i$ is shifted into the circuit of FIG. 3, it passes in a bit-by-bit sequence through the two flip-flops $T^1_1$ and $T^1_2$ of the shift register. The bit timing is assumed to be such that at $t_1$ bit time, the Y bit of the data or blank record in FIG. 1 is in the $T^1_2$ flip-flop, and the X bit of the data or blank record is in the $T^1_1$ flip-flop. The term $t_c$ is a bit timing term which occurs during each successive bit time, with the exception of $t_1$. Therefore, $t_c = \overline{t}_1$.

The flip-flops in the circuit of FIG. 3 are identified as $T^1_1$ and $T^1_2$ so as to indicate that similar flip-flops occur in each of the various $A_i$ circuits. The set output terminal $T^1_2$ of the flip-flop $T^1_2$ is connected to an "and" gate 104, as is the term $t_c$. It will be appreciated, therefore, that as the record $L_i$ is stepped into the circuit $A_i$, all the bits of the record are passed unchanged through the "and" gate 104, and through an "or" gate 106 to the output terminal of the circuit, with the exception of the Y, or first bit.

The circuit $A_i$ either serves to make the first bit, or Y bit, a "1" under certain circumstances, so that the corresponding data or blank record may be distinguished, or to make it a "0" under certain circumstances, so that the corresponding distinguished blank or data record (B* or D*) may be returned to its undistinguished state (B or D).

The circuit $A_i$ also includes a flip-flop $D^*_i$. The flip-flop is set when a distinguished data record (D*) is placed in the corresponding memory element $L_i$, so that the flip-flop $D^*_i$ indicates the presence of a distinguished data record (D*) in the associated memory element $L_i$. The flip-flop $D^*_i$ is set by terms $t_1 R_2^i$ from the circuit $B_i$ (to be described in conjunction with FIG. 5) which are introduced to the set input terminal through an "and" gate 108. The flip-flop $D^*_i$ is reset when a distinguished record (D*) is read from the associated memory element $L_i$ this being achieved by the term $T^1_1 T^1_2$ and $t_1$ which are introduced to the reset input terminal of the flip-flop $D^*_i$ through an "and" gate 110.

The circuit $A_i$ also includes a flip-flop $B^*_i$. This latter flip-flop is set by the terms $t_1 \overline{R}_1^i$ and $R_2^i$ which are also derived from the $B_i$ circuit of FIG. 5, and are introduced to the set input terminal of the flip-flop $B^*_i$ through an "and" gate 112. The setting of the flip-flop $B^*_i$ occurs when a distinguished blank record B* is placed in the associated memory element $L_i$. That is, the flip-flop $B^*_i$ indicates the presence of a distinguished blank record B* in the associated memory element $L_i$.

The flip-flop $B^*_i$ is reset in the circuit $A_i$ when a distinguished blank record B* passes out from the associated memory element $L_i$ and through the $A_i$ circuit. This resetting of the $B^*_i$ flip-flop is achieved from the output of an "and" gate 114, the terms $\overline{T}^1_1$ and $\overline{T}^1_2$, and $t_1$ being introduced to the "and" gate.

The $A_i$ circuit of FIG. 3 also includes a flip-flop $N_i$. The flip-flop $N_i$ is set to indicate the absence of data in the corresponding memory element $L_i$.

Whenever a data record is passed from the circuit $B_i$ of FIG. 5 to the $L_i$ memory element, the flip-flop $N_i$ is reset by the terms $R_1^i$ and $t_1$, which are introduced to the reset input terminal of the flip-flop $N_i$ through an "and" gate 116. The flip-flop $N_i$ is set by the presence of an ordinary blank record (B) in the memory element $L_i$, and when the $D^*_i$ flip-flop is reset, which indicates that no data record has as yet been placed in that memory element $L_i$. The setting of the flip-flop $N_i$ is achieved through an "and" gate 118, the terms $\overline{D}_i^*$, $\overline{T}_2^i$, $\overline{T}_1^i$ and and $t_1$ being introduced to the "and" gate.

In order for the circuit $A_i$ to perform all the functions described above, an additional group of "and" gates 120, 122, 124 and 126 are included in the circuit. These "and" gates are all connected through an "or" gate 128 to an "and" gate 130. The term $t_1$ is applied to the "and" gate 130, and that "and" gate is connected to the output terminal through the "or" gate 106. The circuit also includes an "and" gate 127 which also is connected to the "or" gate 128. The term $L_{i+1}$, $N_i$ and $t_1$ are both introduced to the "and" gate 127.

The terms $\overline{D}^*_i$ and $T_1^i$ are applied to the "and" gate 120. The terms $D_i$ and $\overline{B}_i^*$, together with the term $\overline{T}_1^i$ are introduced to the "and" gate 122. The terms $N_{n-i+2}$, $N_{n-i+3}$ · · · $N_i$, $\overline{B}_{n-i+1}$, $N_{n-i+1}$ and $T_1^{n-i+1}$ are all applied to the "and" gate 124. The terms $\overline{T}_1^i$, $T^*_{i-1}$, $\overline{B}^*_{i-1}$ and $T_1^{i\pm 1}$ are all applied to the "and" gate 126.

The output term $L'_i$ of the circuit $A_i$ can be expressed by the following logic equation:

$$L'_i = L_i \cdot \overline{t} + t_1(\overline{D}_i^* \cdot T_1^i + D_i^* \cdot \overline{B}_i^* \cdot \overline{T}_1^i)$$
$$+ (N_{n-i+2} \cdot N_{n-i+3} \cdots N_i \cdot \overline{B}^*_{n-i+1} \cdot \overline{N}_{n-i+1} \cdot T_1^{n-i+1}) t_1$$
$$+ (\overline{T}_1^i \cdot D^*_{i-1} \cdot B^*_{i-1} \cdot T_1^{i\pm 1}) t_1 + t_1 \cdot L_{i+1}$$

In the above equation, the term $L_i \overline{t}_1$ represents the data or blank record which is passed by the $T_i$ network, with all the bits unchanged, with the exception of the first or Y bit (FIG. 1), which may or may not be altered, in accordance with the remaining terms of the equation. Because the Y bit occurs at $t_1$ time, all the remaining terms in the equation are qualified by the $\overline{t}_1$ term.

With respect to $\overline{D}_i^* \cdot T_1^i$, this term indicates that a data record is being read out of the corresponding memory element $L_i$, and that there is no distinguished data record (D*) in the memory element. This data record is to be distinguished by $A_i$, so that its Y bit is made into a "1" by the term in question.

Likewise, the term $D_1^* \cdot \overline{B}_1^* \cdot T_1^1$ represents that a bank record is being read out of the corresponding memory element $L_1$, that there is data record in the corresponding memory element, and that there is no distinguished blank record in the memory element. The operation of the system requires that such a blank record (B) be distinguished (B*).

The remaining terms in the above equation fulfill the conditions described above, whereby the blank records out of certain empty lines are distinguished.

As mentioned above, all of the circuits $S_1-S_6$ and $S'_1-S'_6$ are identical. These circuits may each be represented by the circuit $S_i$ of FIG. 4. The circuit $S_i$ acts on the inputs applied to its input terminals $a$ and $b$, so that these inputs appear either in the same position at the output terminals $c$ and $d$, or in an exchanged position at the output terminals.

The circuit $S_i$ will make the exchange if a distinguished blank record (B*) is applied to the $a$ input terminal, and a distinguished data record (D*) is applied to the $b$ input terminal, if further conditions are met.

For example, it is also required that a D* data record will pass up the system past any empty memory element. For this purpose, the $S_i$ circuit is made to exchange if a D* record from the memory element $L_{i-1}$ is applied to its input terminal $b$, and the corresponding memory element ($L_i$) connected to the $a$ input terminal is empty ($N_i$). However, a B* must be encountered from the memory element ($L_i$) or the corresponding circuit $S'_i$ will return the D* record to its original memory element ($L_{i-1}$) by failing to exchange the record D*.

The circuit $S_i$ includes a flip-flop $E_i$. This is the exchange flip-flop, and it is set if the inputs applied to the terminals $a$ and $b$ are to be exchanged. The flip-flop $E_i$ is set at the beginning of each record time, and if the flip-flop remains set throughout the record time, the exchange is made. However, if the above-stated conditions do not exist, the flip-flop is reset. The term introduced to the flip-flop $E_i$ to reset the flip-flop is:

$$\overline{N}_i[L'_i \cdot t_2 + L'_{i-1} \cdot t_2 + \overline{L}'_i \cdot t_1 + \overline{L}'_{i-1} \cdot t_1]$$
$$+ N_i[\overline{L}'_{i-1} \cdot t_2 + \overline{L}'_{i-1} \cdot t_1]$$

The input terminal $a$ is connected to an "and" gate 200 which, in turn, is connected through an "or" gate 202 to the output terminal $c$. The input terminal $b$, on the other hand, is connected to an "and" gate 204 which, in turn, is connected through an "or" gate 208 to the output terminal $d$. The term $\overline{E}_i$ is also introduced to the "and" gate 200, and the term $\overline{E}_i$ is also applied to the "and" gate 204.

The input terminal $a$ is also connected to an "and" gate 212. The latter "and" gate is connected to the "or" gate 208. The term $E_i$ is applied to the "and" gate 212. The input terminal $b$ is also connected to a further "and" gate 220, as in the term $E_i$. The "and" gate 220 is connected to the "or" gate 202.

It will be appreciated that so long as the flip-flop $E_i$ is reset ($\overline{E}_i$), the input at the terminal $a$ will pass through the "and" gate 200 through the "or" gate 202 to the output terminal $c$. At the same time, the input at the input terminal $b$ will pass through the "and" gate 204 and through the "or" gate 208 to the output terminal $d$.

Conversely, when the flip-flop $E_i$ is set, the input at the input terminal $b$ passes through the "and" gate 220 and through the "or" gate 202 to the output terminal $c$; and the input at the input terminal $a$ passes through the "and" gate 212 and through the "or" gate 208 to the output terminal $d$. Therefore, an exchange is made.

The circuit $S_0$ of FIG. 2 may be similar to the circuit $S_i$ described above, except that its logic may be simplified so that an exchange is made only when a B* record is applied to its input terminal $a_0$ and a D* record is applied to its input terminal $b_0$. That is, the second resetting term of the flip-flop $E_0$ is omitted.

The circuit $B_1-B_6$ are identical, and these circuits are represented by the circuits $B_i$ in FIG. 5. The circuit $B_i$ serves to append a * to the D and B records, under certain conditions, and it also controls the setting of the $D^*_i$ and $B^*_i$ flip-flops in the $A_i$ circuit of FIG. 3, and the $N_i$ flip-flop in the $A_i$ circuit. In addition, the output of the circuit $B_i$ may have a * removed, if the conditions to be described are not fulfilled. The circuit includes two flip-flops $R_1^i$ and $R_2^i$ which are connected as a shift register.

The output of the circuit $B_i$ may be expressed as $$L'''_i = L''_i \cdot \bar{t}_1 + t_1 \cdot R_1^i \{N_i + \overline{D}^*_i (E_i + E'_i) \\ + [\overline{B}^*_i \cdot \overline{N}_i + N_{n-i+2} \cdot N_{n-i+3} \ldots N_i] t_i \overline{B}^*_{n-i+1} \\ \cdot \overline{N}_{n-i+1} \cdot \overline{R}_1^{n-i+1} \cdot \overline{R}_1^i \cdot t_1 + t_1 \cdot \overline{R}_1^i \cdot R_1^{i-1}$$

Also, $n_i = t_1 \cdot R_1$ (Reset $N_i$ flip-flop).
$d^*_i = t_1 \cdot R_2$ (Set $D^*_i$ flip-flop).
$b^*_i = t_1 \cdot \overline{R}_1 \cdot R_2$ (Set $B^*_i$ flip-flop).

The $N_i$ flip-flop is reset when data passes from the output of the $B_i$ circuit ($L'''_i$) to the corresponding memory element $L_i$. The data flip-flop $D^*_i$ is set when a distinguished data record appears at the output of the $B_i$ circuit ($L'''_i$) and is passed to the corresponding memory element $L_i$. Finally, the flip-flop $B^*_i$ is set when a distinguished blank record appears at the output of the circuit $B_i$ and is passed to the corresponding memory element $L_i$.

The equation given above for the output $L'''_i$ is implemented in the circuit of FIG. 5 by a series of "and" gates 300, 302, 304, 306, 308, 310 and 311, and a corresponding series of "or" gates 312, 314, 316 and 318.

The flip-flops $R_1^i$ and $R_2^i$ are connected as a two-bit shift register as mentioned above. The input terminal $x$ is connected to the set input terminal S of the flip-flop $R_1^i$, and through an inverter 330 to the reset input terminal R of that flip-flop. The input $L''_i$ is introduced to the input terminal $x$. The output terminal $R_1^i$ of the flip-flop $R_1^i$ is connected to the set input terminal of the flip-flop $R_2^i$ and through an inverter 334 to the reset input terminal of that flip-flop.

The terms $t_1$ and $R_1^i$ are applied to the "and" gate 116 as described in conjunction with FIG. 3 to provide a reset term for the flip-flop $N_i$ in the circuit $A_i$ of FIG. 3. The terms $t_1$ and $R_2^i$ are applied to the "and" gate 108 as described in conjunction with FIG. 3 to provide the setting term for the flip-flop $D^*_i$ of the circuit $A_i$ of FIG. 3. Finally, the terms $R_2^i$ and $\overline{R}_1^i$ and $t_1$ are applied to the "and" gate 112 as described in conjunction with FIG. 3 to provide the setting term for the flip-flop $B^*_i$.

It will be noted from the circuit of FIG. 5, that at all other bit times, except $t_1$ time, the data $L''_i$ passes through the flip-flop $R_1$, and through the "and" gate 300 and "or" gate 316 to the output terminal, where it appears at the output data $L'''_i$. That is, at all times except $t_1$ bit time, each data or blank record is passed through the circuit $B_i$ and is circulated back to the corresponding memory element $L_i$.

The circuit $B_i$ of FIG. 5 operates on the Y bit (FIG. 1) of the data or blank record, so as to make the bit a "1," under certain conditions, as expressed above.

That is, if the associated memory element $L_i$ is empty ($N_i$), and thus no data could have been exchanged in the corresponding exchange circuit $S_i$ during the preceding record time; or if there is no distinguished record (D*) in the corresponding memory element, and no exchanges were made at either the corresponding $S_i$ or $S'_i$ circuit (that is $E_i + E'_i$), the data record passing through the circuit $B_i$ should be distinguished, as indicated by the corresponding terms in the above equation.

Moreover, if the record passing through the $B_i$ circuit is a B record ($\overline{R}_1$), then it should receive a * if there is no B* record ($\overline{B}^*_i$) in the corresponding memory element ($L_i$), and the memory element contains data ($\overline{N}_i$). Likewise, the blank record B should receive a * if the input to the next longer line is a distinguished blank record, as indicated by the term $t_1\overline{R}_1{}^i R_1{}^{l-1}$. It is to be noted that the term $t_{l-1}$ is used to indicate $t_1$ bit leaving the $B_1$ circuit for the next longer memory element at $t_1$ bit time.

The remaining condition under which a * is applied to a record by the $B_1$ circuit is one in which all memory elements between $L_1$ and $L_{n-l+2}$ are empty ($N_{n-l+2}$, $N_{n-l+3}$ ... $N_1$), and a B* is to be placed in the $L_{n-l+1}$ indicated by $R_1{}^{n-i+1}$, $\overline{R}{}^i_1$ and $N_{n-l+1}$ and $\overline{B}*_{n-l+1}$. Therefore, if there were a memory element above $L_{l-1}$ with a B* output, B* would pass over the empty line. If no $A_{l+j}$ of line $L_{l-j}$ has a B* output, but only a D* or B output, the D* should return to its original line. An undistinguished blank record (B) is changed to a distinguished record (B*) in $B_1$ if the line $L_1$ contains no B* record, and contains data ($\overline{N}_1$). If a line contains a distinguished data record (D*), the flip-flop D*$_1$ is set, of course.

The fragmentary block diagram of FIG. 6 shows how the different circuits, described above, are interconnected in order to carry out the concepts of the invention.

Figure 7:
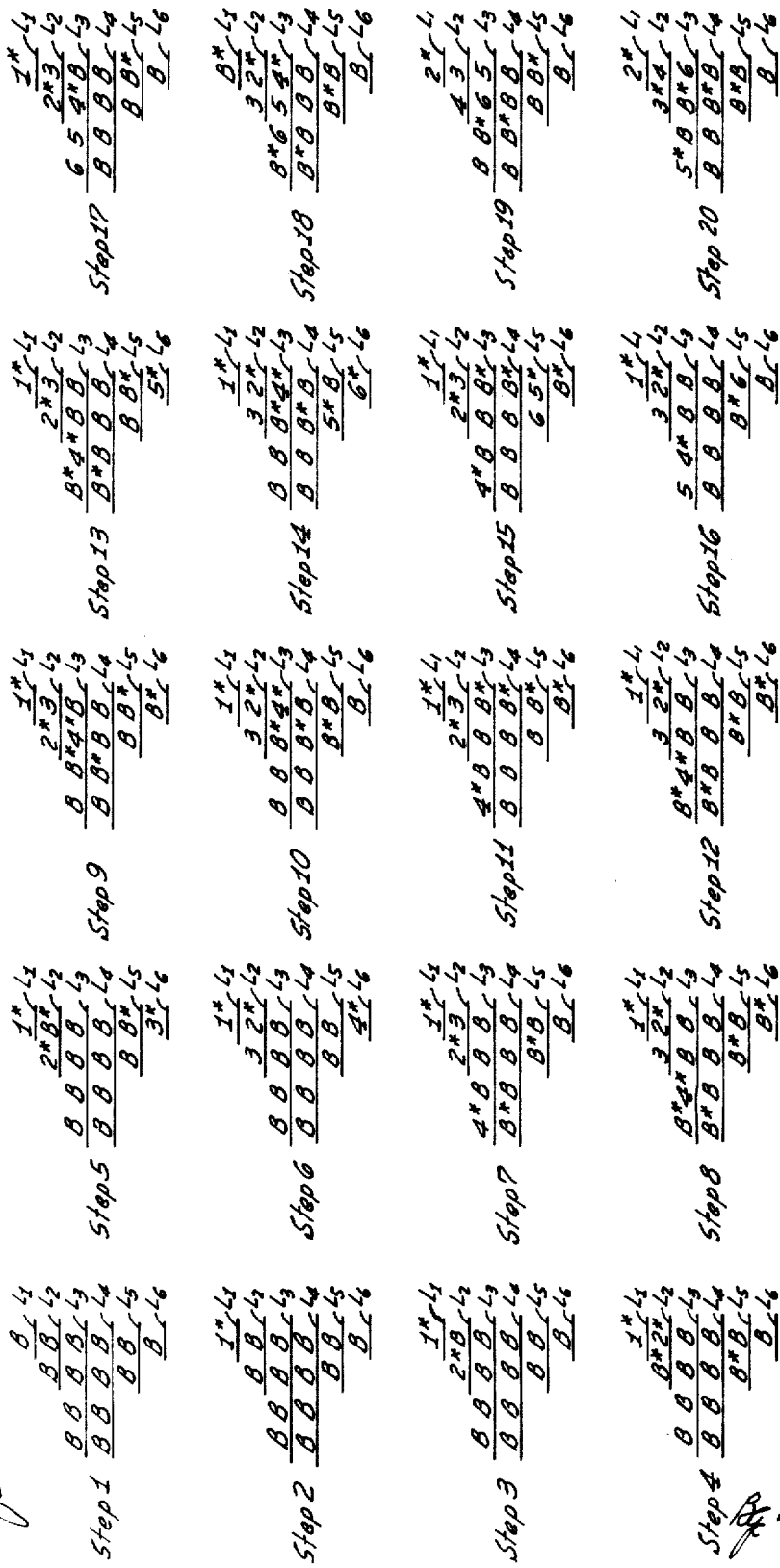
FIG. 7 is a schematic showing of the manner in which records input into the system circulate therein, so as to be available at the output in same order as which they were introduced.

An example of the operation of the buffer system is shown in FIG. 7. In FIG. 7, successive steps are represented during which data records (D*) are fed into the system, with certain interruptions to be described. It is to be understood, that the successive steps of the example of FIG. 3 are assumed to occur at successive record times. In step one of FIG. 7, all the memory elements are empty ($N_1$), and there are no distinguished records of any type in any of the memory elements.

In step two, it is assumed that a first data record, designated "1" is fed into the system on the data input line 10 in FIG. 2. At the same time, a blank record B is fed into the system on the blank line 12, to retain the data record "1*" in the system.

As mentioned above, the input records are distinguished (D*) as they are fed into the system. This is achieved by any appropriate circuit (not shown). Therefore, the input record "1" is a D* record 1*, and it fulfills the condition so that it may be exchanged by the circuits $S_6$, $S_5$, $S_4$, $S_3$, $S_2$, $S_1$ to be set in the #1 memory element $L_1$, as shown. Under these conditions, there are no distinguished blank records (B*) placed in any of the memory elements.

At step three, it is assumed that a second data record, designated (2*) is fed into the system. At the same time, the blank output from the $L_2$ memory element is distinguished (B*) in the circuit $A_2$, because the conditions are fulfilled.

It is assumed that during step four, the next record time, no data record is fed into the machine. It will be understood, of course, that during each record time, a blank record (B) is fed into the machine on line 12 of FIG. 2, so as to hold the data records in the buffer system.

During the conditions of step four, the B* record is placed in the memory element $L_2$ because the conditions $\overline{R}_1$, $\overline{B}*_2$ and $\overline{N}_2$ are met in the circuit $B_2$ so that the gate 304 is enabled. Also, a B* record is placed in $L_5$ ($L_{6-2+1}$) because the term $\overline{N}_2 \cdot N_3 \cdot N_4 \cdot N_5 \cdot \overline{B}*_2 \cdot \overline{R}_1{}^5 \cdot \overline{R}_1{}^2$ is satisfied.

During the next record time, as shown by step five, is assumed that the third record 3* is fed into the machine.

Here, the record 3 is placed in the memory element $L_6$, as shown, because there is no B* output from any of the other elements. It will be observed that the information in the memory elements $L_1$ and $L_2$ circulate in steps four and five, because they do not fulfill any conditions for exchange in their associated exchange circuits.

During the next record time, as shown, by step six in FIG. 7, the data record 4* is fed into the system on the input line 10. During this latter operation, the conditions are such that the data record 3* is transferred up to the memory element $L_2$ and the data record 4* is retained in the memory element $L_6$. During the operation, the data record 3 loses its * in the circuit $B_6$, because there is a distinguished data record in the $L_2$ memory element D*$_2$.

At step seven, no further record is introduced into the system. The data record 4* is transferred up to $L_3$, and retains its * because it is the first data record to be placed in the memory element $L_3$. Before the data record 4* is placed in the memory element $L_3$, the 2* record was output from the circuit $A_2$. Hence, the condition $[O_2 * \overline{B}_2 * \overline{T}_1{}^3 T_1{}^2]$ existed in the circuit $A_3$ to enable the gate 126 of FIG. 3, so that there was a B* output from the circuit $A_3$ which permitted the exchange to be made so that the 4* data record could be placed in the memory element $L_3$.

In the next record time, step eight in FIG. 7, again, no further data record was placed in the system. During these conditions, and as shown, a B* record is placed in the $L_3$ memory element since the term $\overline{R}_1{}^3 \cdot \overline{B}*_3 \cdot \overline{N}_3$ is satisfied. Also, a distinguished blank record B* is placed in the memory element $L_4$ because $N^1{}_{6-4+2} \cdot \overline{N}^3{}_{6-4+1} \cdot \overline{R}^3_1 \cdot \overline{R}^4_1$ is satisfied. Likewise, a blank distinguished record B* is placed in the memory element $L_5$ because the term $\overline{R}_1 \cdot \overline{B}*_5 \cdot N_5 \cdot t_1{}^4$ is satisfied.

Likewise, and as shown, a B* is placed in the memory element $L_6$. In step nine, still no further data record is introduced into the machine, and the illustrated condition obtains. This also applies to step ten. It will be noted in the latter step, that a B* is inserted in the memory elements $L_4$, $L_5$ and $L_6$ because there is a B*, in each instance, in the next higher line.

Likewise, in steps eleven and twelve, no further data is introduced into the machine, and the illustrated conditions occur. At step thirteen, the data record 5* is introduced; and at step fourteen the data record 6* is introduced. No data is introduced during the word time corresponding to step fifteen, or in any other of the following illustrated steps.

During step sixteen, the data record 5 does not have a * when inserted in the memory element $L_3$, because of the presence of a distinguished data record 4* in that memory element. Also, there is no distinguished blank record B* in the memory element $L_4$, because $\overline{N}_3 \cdot \overline{R}_1{}^3 \cdot N_4 \cdot R_1$ is not satisfied.

In step eighteen, it is assumed that the data record 1* was removed from the system. This is achieved by introducing a B* blank on the line 12 of FIG. 2, so that it will exchange with the data record 1* in the exchange circuit $S_0$, and appear at the data output line 11 in FIG. 2. It will be noted in step nineteen that the conditions are such that there are no distinguished data records in the memory element $L_2$, or in any other of the elements of the system.

In like manner, the system can be controlled through additional steps as data is fed into the buffer on line 10 of FIG. 2, or removed from the buffer on line 11.

The invention provides, therefore, an improved buffer storage apparatus in which data may be introduced at the input thereof as a serial stream of binary multi-bit data records.

As described above, the input operation of the data records may be interrupted at any record time, merely by introducing a blank record (B or B*) on the input line 10, and the interruption may be continued for any desired number of record times. Also, the output operation may be commenced at any record time during the input operation, after the input operation, or during any interruption in the input operation, merely by introducing a distinguished blank records (B*) rather than an ordinary blank record (B) on the line 12.

The function of the exchange circuits $S_0$–$S_6$ and $S'_1$–$S'_6$ is to exhibit the capabilities of exchanging records from the inputs 10, 12, $L'_1$–$L'_6$, so that any one of such records may appear at any one of the outputs 11, 32, $L''_1$–$L''_6$. This function may be achieved by a variety of interconnections of the exchange circuits $S_0$–$S_6$ and $S'_1$–$S'_6$, a second type of network capable of performing the function being shown in FIG. 8 and including a plurality of exchange circuits S, connected as shown, and which individually may be similar to the exchange circuits $S_0$–$S_6$ and $S'_1$–$S'_6$ of FIG. 2.

As described above, the exchange circuits $S_0$–$S_6$, $S'_1$–$S'_6$ are individually controlled so as to exchange their inputs, only if certain conditions are met. That is the individual exchange circuits will respond to a data record input and exchange it with its other input, only if the other input is a blank record. If two data records are applied to any individual exchange circuit, no exchange is made. Moreover, an exchange is made between a data record and a blank, only if it is the first data record out of a line. The overall control is such that a data output record from any memory element is either returned to the same memory element, or if it is the first data record out of the particular memory element, it is returned to a higher memory element which exhibits corresponding blank records.

Figure 8:
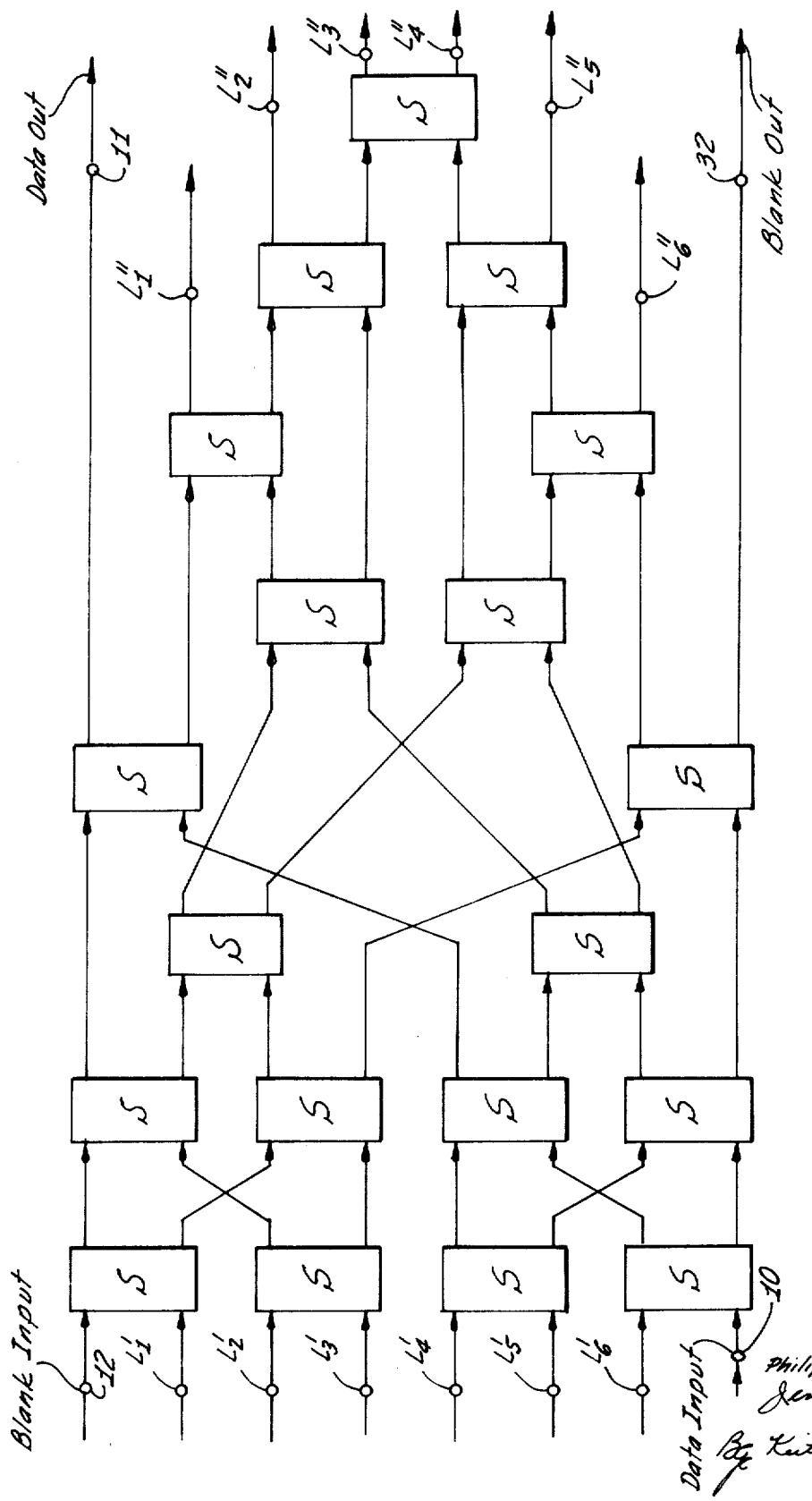
FIG. 8 is a block diagram of a buffer storage apparatus construction in accordance with a second embodiment of the invention.

The exchange circuits S of the embodiment of FIG. 8 may be controlled in the same manner as described above to perform the same individual and overall function as the circuits $S_0$–$S_6$ and $S'_1$–$S'_6$ of FIG. 2.

Figure 9:
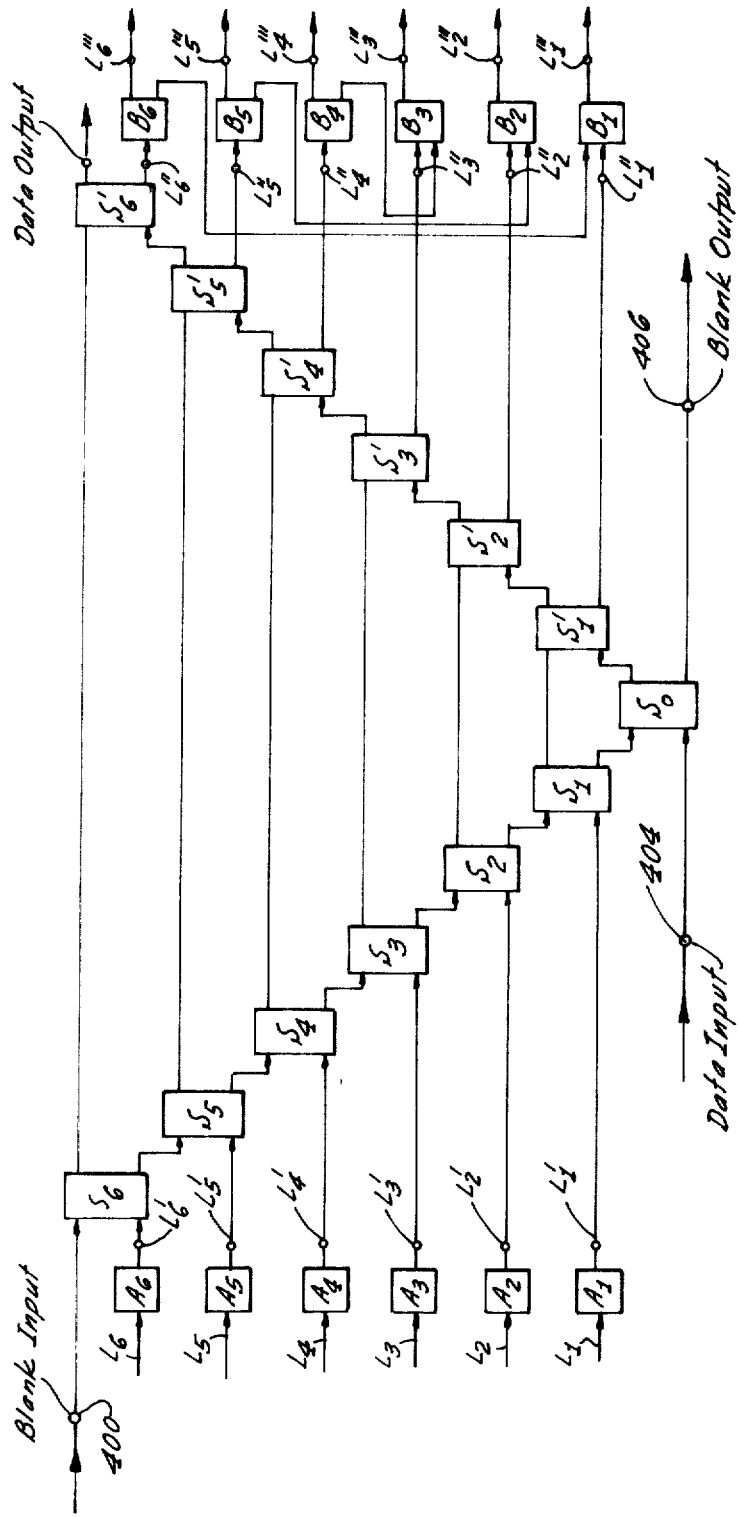
FIG. 9 is a block diagram of a buffer storage system constructed in accordance with another embodiment.

The embodiment of the invention shown in FIG. 9 is essentially similar to the embodiment of FIG. 8, except that certain changes and modifications are effectuated whereby the necessary logic circuitry is simplified to a large extent. The embodiment of FIG. 9 may use memory elements (not shown) similar to those designated 14, 16, 18, 20, 22 and 24 in FIG. 2, with the corresponding outputs $L_1$–$L_6$ ($L_1$) being connected respectively to circuits $A_1$–$A_6$ ($A_1$), as shown.

As before, the memory elements have records lengths selected in accordance with the previous formula, and in the illustrated example of FIG. 9, the record lengths of the memory elements are 1, 2, 4, 4, 2, 1 respectively. As before, the memory elements may be in the form of actual delay lines, or they may be constituted by writing the records on individual tracks of a memory disc, tape or drum, and of subsequently reading the records at predetermined record times later, so as to constitute the desired effective delay, or storage time, in the individual memory elements.

Likewise, the circuit of FIG. 9 includes a series of circuits $B_1$–$B_6$($B_1$) whose outputs are designated $$L_1'''-L_6'''(L_1''')$$

and which are connected back to the respective inputs of the various memory elements, as in the previous embodiments.

The outputs $L_1$–$L_6$($L_1$) of the respective memory elements are introduced to the respective circuits $A_1$–$A_6$($A_1$) in the circuit of FIG. 9, as mentioned, and these latter circuits are connected to one of the input terminals of the circuits $S_0$–$S_6$($S_1$), in the manner shown, and these latter circuits are interconnected with each other, and with the additional circuits $S'_1$–$S'_6$($S'_1$) in the illustrated chain relationship. One of the output terminals of the circuits $S'_1$–$S'_6$ are connected to respective ones of the circuits $B_1$–$B_6$ in the system of FIG. 9.

When distinguished blank records (B*) are introduced into the system along the line 400, which is connected to the other input terminal of the circuit $S_6$, the data records are derived on the line 402 which is connected to the other output terminal of the circuit $S'_6$. This occurs when data records are introduced into the system along the line 404 which is connected to the other input terminal of the circuit $S_0$. At the same time, the blank records appear on the line 406 which is connected to the other output teriminal of the circuit $S_0$.

The circuits $A_6$, $A_5$, $A_4$, $A_3$, $A_2$, $A_1$, are interconnected, as shown, so that whenever a circuit $A_{i+1}$ detects a (*), it serves to introduce a (*) to the data or blank record then passing through the adjacent circuit $A_i$, as will be described in greater detail. Likewise, the circuits $B_6$–$B_1$, $B_5$–$B_2$, and $B_4$–$B_3$, are interconnected as shown, so that whenever a (*) is removed from a record by a particular one of the circuits $B_i$, a (*) is removed from a corresponding record in the other circuit $B_i$ to which the first is connected, as also will be descibed in greater detail.

For purposes of description, it may be assumed that each of the circuits $A_i$, $S_i$ and $B_i$ is equipped with a two-bit shift register. The two-bits labelled X and Y in FIG. 1 will be referred to in the following description as $X_A$, $X_S$, $X_B$ and $Y_A$, $Y_S$, $Y_B$, depending upon which group of circuits is being referred to; and, where necessary, these bits will be referred to as $X_A^i$, $X_S^i$, $X_B^i$ and $Y_A^i$, $Y_S^i$, $Y_B^i$, to indicate the bits in the articular circuits.

For all the circuits $A_i$, $S_i$ and $B_i$, at time $t_0$, the first bit of a data or blank record will be assumed to be an X; at time $t_1$ the first bit will be assumed to be a Y and the second bit will be an X; and at time $t_2$, the first bit will have passed from the circuit, and the second bit will be assumed to be a Y. In the circuits $A_i$, a (*) is appended to a data record if a data record enters the particular circuit $A_i$, and its corresponding memory $L_i$ does not contain a (*'d) data record (D*). Likewise, a (*) is appended to a blank record if there is data in the corresponding line ($L_i$) but no B* blank record, or if a (*) is derived from the line $A_{i+1}$.

The aforesaid action of the $A_i$ circuit is shown in the logic diagram of FIG. 10, in which a series of "and" gates 500, 502, 504 are connected to an "or" gate 506 which, in turn, is connected to an "or" gate 508. An "and" gate 510 is also connected to the "or" gate 508. The terms $\overline{D}_1^*$, $X_A$, and $t_1$, are applied to the "and" gate 500; the terms $\overline{B}_1^*$, $\overline{X}_A$, $t_1$ and $D^*_1$ are applied to the "and" gate 502; and the terms $\overline{D}_1^*$, $\overline{B}_1^*$, $\overline{X}_A$, and the (*) from the next line $A_{i+1}$ are applied to the "and" gate 504.

The terms applied to the "and" gate 500 causes a (*) to be appended to a data record ($t_1$, $X_A$) if the corresponding memory element does not contain a distinguished data record ($\overline{D}_1^*$). Likewise, the "and" gate serves to apply a (*) to a blank record ($t_1$, $\overline{X}_A$) if there is data in the corresponding memory element ($D^*_1$), and if there are no distinguished blank records (B*) in the line, as designated by the term ($\overline{B}_1^*$).

The "and" gate 504 serves to apply a (*) to the output of the $A_1$ circuit, if such a (*) is received from the circuit $A_{i+1}$, and under the conditions where a blank record in the circuit $A_1$ is undistinguished ($\overline{B}^*_1$, $\overline{X}_A$) and there are no distinguished records in the corresponding memory element ($\overline{D}_1^*$).

The "and" gate 510 assures that all records passing through the $A_1$ circuit lose their (*), by virtue of the terms $\overline{t}_1$, $Y_A$. However, additional logic circuitry in the $A_1$ circuit, as shown by FIG. 11, and which includes "and" gates 512 and 514 resets the records to their distinguished (*) condition, when a distinguished record enters the circuit. The data records $D_1$ are reset by the "and" gate 512, due to its input terms $X_A$, $Y_A$, $t_1$. Likewise, the blank records are reset by the "and" gate 514, due to its input terms $\overline{X}_A$, $Y_A$, $t_1$.

The circuits $S_1$ and $S'_1$ are identical, and are similar to those previously described herein. The circuit $S_1$ does not change its inputs except to exchange them under the conditions prescribed herein. That is, the $S_1$ circuits exchange their inputs only when the input applied to the upper input terminal is a B*, and the input applied to the lower input terminal is a D*. This also applies to the circuits $S'_i$. Otherwise, the input applied to the upper input terminal is passed to the upper output terminal, and the input applied to the lower input terminal is passed to the lower output terminal.

The circuits $B_1$ are shown in logic detail in FIG. 12, and these circuits include a group of "and" gates 600, 602, 604 and 606 which are connected to an "or" gate 608. The output of the "or" gate is passed through an inverter 610 to an "or" gate 612. A further "or" gate 614 is connected to the "or" gate 612. The output of the inverter 610 is also connected to a pair of "and" gates 616 and 618.

The circuit $B_i$ serves to remove the (*) from a data record if there already is a distinguished data record in the corresponding memory element ($D_i$*). This is accomplished by the terms $D_i$*, $X_B$ and $t_1$ applied to the "and" gate 600. The circuit $B_i$ also serves to remove the (*) from a distinguished blank record, if there already is a distinguished blank record (B*) in the corresponding memory element. This is accomplished by the "and" gate 604, the terms $B^*_i$, $\overline{X}_B$ and $t_1$ being applied to the latter "and" gate.

The circuit $B_i$ also serves to remove the (*) from a distinguished record if the record in the particular circuit $B_i$ came from a lower line, and if the output of the corresponding memory element $L_i$ was a data record which was introduced to a higher line. This is achieved by the "and" gate 602, and by the terms $\overline{D}_i$*, $\overline{B}_i$*, $E_i$, $t_1$ and $X_B$, applied to the "and" gate 602.

The "and" gate 606 serves to remove the (*) from a blank record, under conditions where the output from the corresponding $B_{n-i+1}$ circuit is undistinguished ($\overline{*}$) where $i \leqslant n/2$ if $n$ is odd; and $$i < \frac{n}{2}$$

if $n$ is even. On the other hand, if the output from the corresponding circuit $B_{n-i+1}$ is either a D* or B* record, the output of the circuit $B_i$ is B*, since the "and" gate 606 is then disabled. This is accomplished by the terms $\overline{X}_B$, $B^*_i$, $\overline{D}^*_i$, $t_1$ and $\overline{*}$, applied to the "and" gate 606.

The output from the "or" gate 608 is passed through the inverter 610, and then back to the corresponding memory element $L_i$ through the "or" gate 612. The "or" gate 614 serves to remove the (*) of all distinguished data or blank records applied to the circuit $B_i$. However, the "and" gate 616 resets each blank record $B_i$ to its $B^*_i$ state, and the "and" gate 618 sets each $D_i$ record leaving the circuit $B_i$ to its $D^*_i$ state.

What is claimed is:

1. A buffer system for the storage of a plurality of multi-bit binary records of the data or blank type, each of said records including a two-bit control field of which a first bit serves to identify the record as a data or blank, said system including: a plurality of memory elements through which the records are circulated on a serial bit-by-bit basis and each of said memory elements having a capacity to hold predetermined numbers of said records being circulated therethrough; a corresponding plurality of first control circuits respectively coupled to the inputs of said memory elements and serving to set the second bit of each of the aforesaid two-bit control fields to a predetermined status for selected ones of the aforesaid records; a corresponding plurality of second control circuits respectively coupled to the outputs of said memory elements for detecting the status of the second bit of each of the two-bit control fields of the records output therefrom; and a plurality of exchange circuits interconnected with one another and interposed between said second control circuits and said first control circuits and individually serving to transpose the position of a pair of the aforesaid records applied to its input terminals with respect to the position thereof at its output terminals dependent upon the status of said control fields of the said records as detected by said second control circuits.

2. The combination defined in claim 1, in which said first control circuits serve to set the second bit of each of the aforesaid two-bit control fields to said predetermined status for the first data record to be circulated through any one of said memory elements.

3. The combination defined in claim 1, and which includes a blank input line connected to an input of one of the said exchange circuits for introducing said blank records into said system on a serial bit-by-bit successive basis.

4. The combination defined in claim 1, and which includes a data input line connected to an input of one of said exchange circuits for feeding records into the system on a serial bit-by-bit successive basis.

5. The combination defined in claim 1, and which includes a data output line connected to an output of one of said exchange circuits and on which the data records output from the system appear on a serial bit-by-bit successive basis.

6. The combination defined in claim 1, and which includes a blank input line for introducing said blank records into said system on a serial bit-by-bit successive basis; a data input line for feeding the records into the system on a serial bit-by-bit successive basis; and a data output line on which the records output from the system appear on a serial bit-by-bit successive basis.

7. The combination defined in claim 6, in which said exchange circuits include a plurality of first exchange circuits being serially interconnected to one another and parallelly connected to the output terminals of said second control circuits, and said data input line being connected to the first of said serially connected first exchange circuits, and said exchange circuits further includes a plurality of second exchange circuits like said first exchange circuits serially interconnected to one another and parallelly connected to said first exchange circuits and to the input terminals of said first control circuits, and said exchange circuits further includes an intermediate exchange circuit being serially interconnected between said first and second exchange circuits and being connected to said data output line and to said blank output line.

8. The combination of claim 1, in which said memory elements have record storing capabilities in accordance with the progressions 1, 2, 4 . . . $2^n$, $2^n$, $2^{n-1}$ . . . 1, where $n$ is even.

9. The combination of claim 1, in which said memory elements have record holding capabilities in accordance with the progressions 1, 2, 4 . . . $2^{n-1}$, $2^n$, $2^{n-1}$ . . . 1, where $n$ is odd.

10. The combination defined in claim 1, in which said exchange circuits include a plurality of first exchange circuits interconnected with one another and with the output terminals of said second control circuits, each of said first exchange circuits having two input terminals and two output terminals, and each of said first exchange circuits serving to transpose the position of a pair of records applied to said input terminals with respect to the position thereof at said output terminals dependent upon the status of said control fields of said records as detected by said second control circuits; and a plurality of second exchange circuits like said first exchange circuits and interconnected with one another and with said first exchange circuits, and said second exchange circuits being further connected to the input terminals of said first control circuits.

11. The combination defined in claim 6, in which said exchange circuits include a plurality of first exchange circuits being serially interconnected to one another and parallelly connected to the output terminals of said second control circuits, said blank input line being connected to the first of said serially connected first exchange circuits, and in which said exchange circuits further include a plurality of second exchange circuits like said first exchange circuits serially interconnected to one another and parallelly connected to said first exchange circuits and to the input terminals of said first control circuits, said data output line being connected to the first of said serially connected second exchange circuits, and said exchange circuits further include an intermediate exchange circuit being serially interconnected between said first and second exchange circuits and being connected to said data input line.

No references cited.

PAUL J. HENON, Primary Examiner

H. E. SPRINGBORN, Assistant Examiner